Dec. 30, 1930.　　　F. T. SWAIN ET AL　　　1,786,552
GEAR CUTTING MACHINE
Filed March 26, 1927　　　3 Sheets-Sheet 1
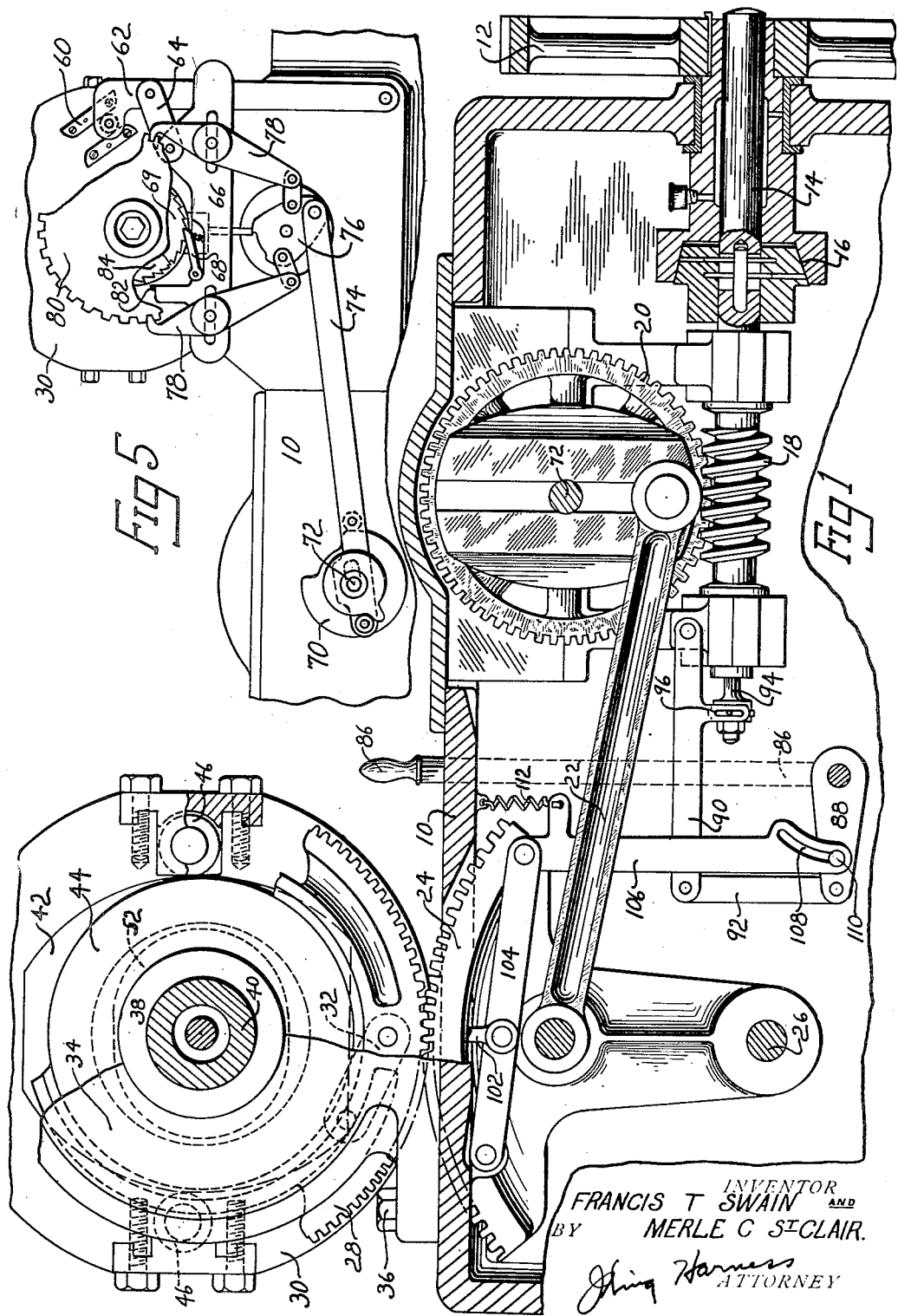
INVENTOR
FRANCIS T SWAIN AND
BY　　MERLE C S<sup>T</sup> CLAIR.
ATTORNEY

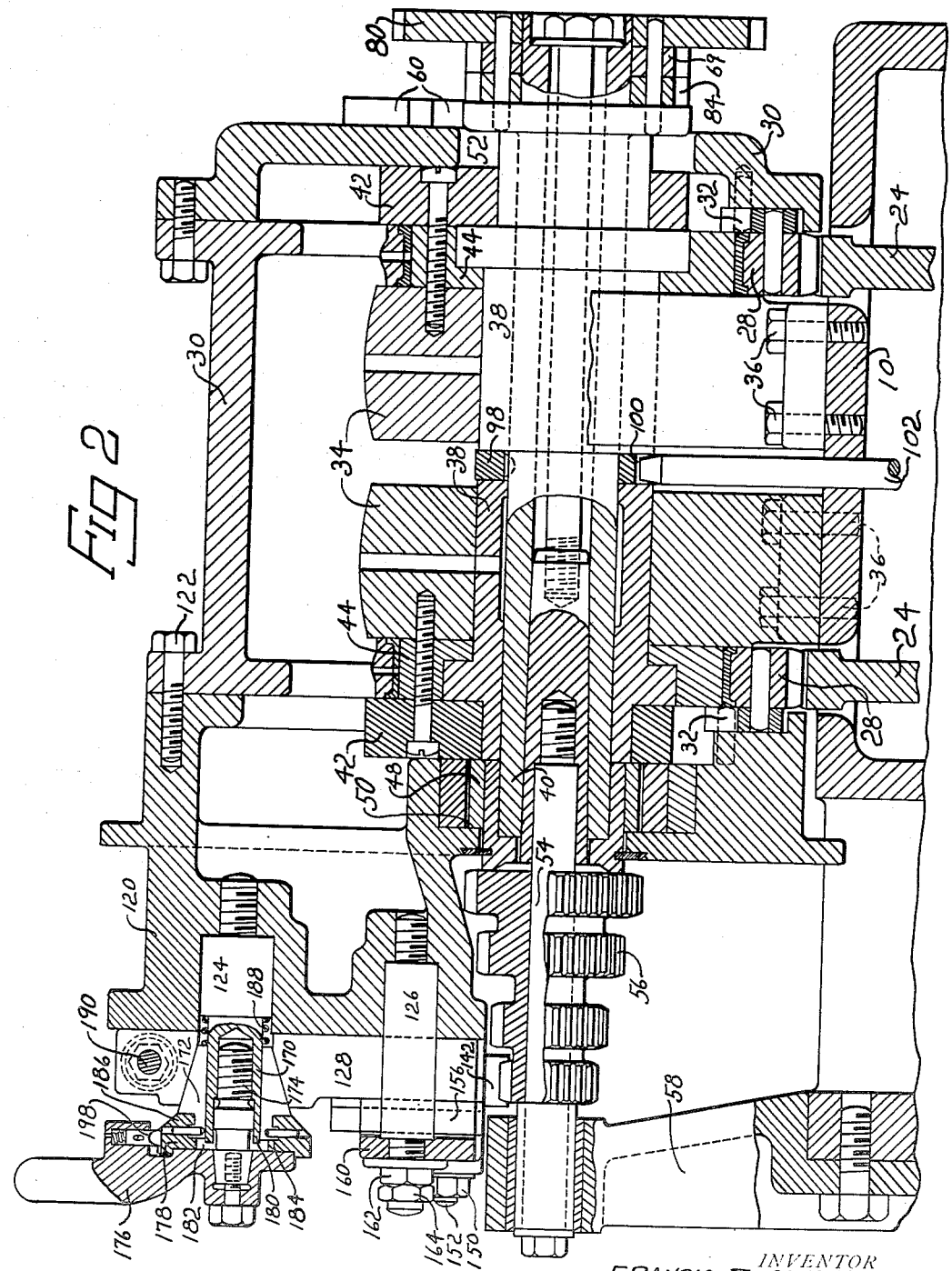

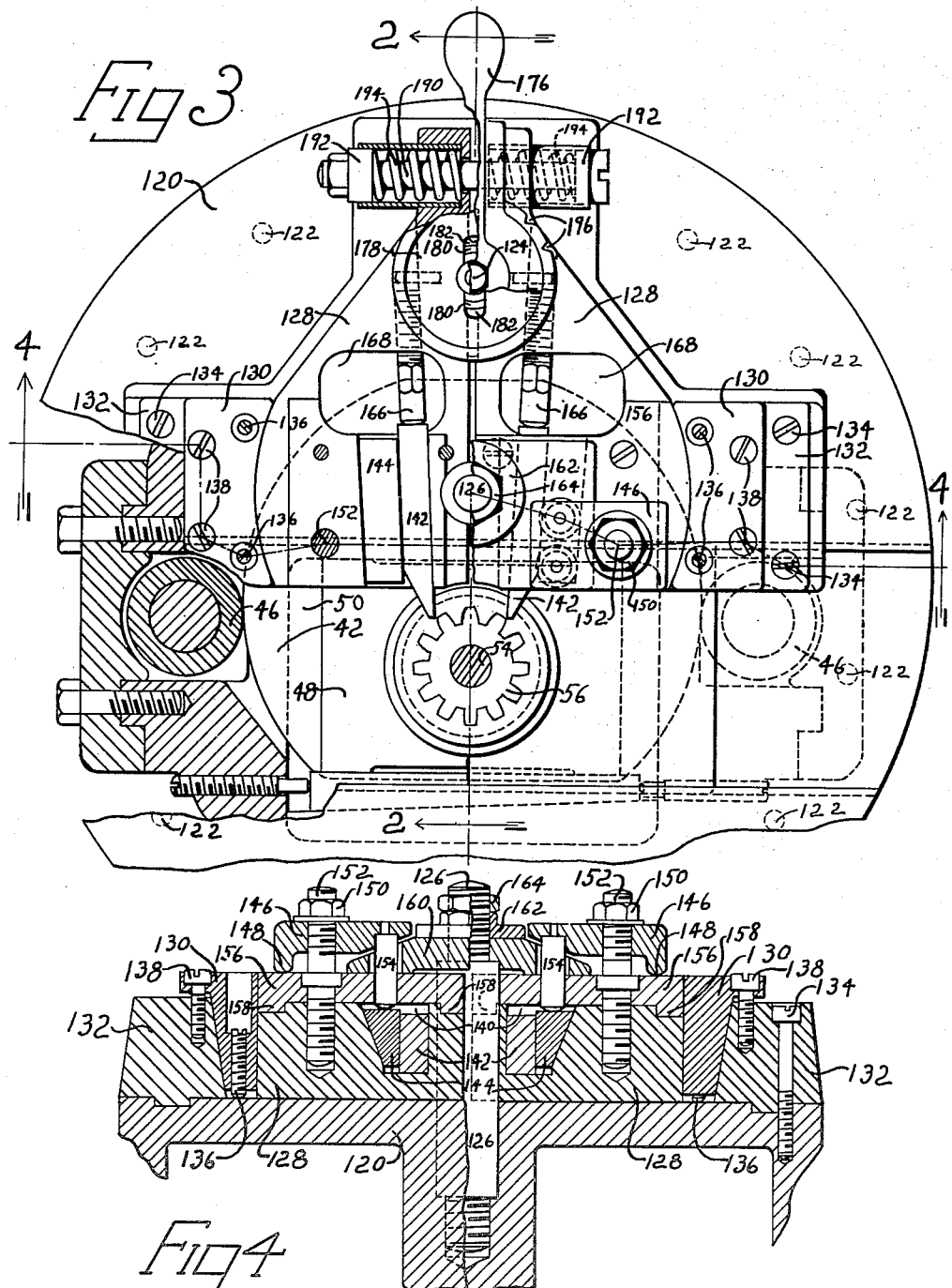

Patented Dec. 30, 1930

1,786,552

UNITED STATES PATENT OFFICE

FRANCIS T. SWAIN AND MERLE C. ST. CLAIR, OF NEWCASTLE, INDIANA

GEAR-CUTTING MACHINE

Application filed March 26, 1927. Serial No. 178,596.

This invention relates to improvements in gear cutting machinery and more particularly to improvements in a machine for cutting curved surfaces.

An important object of the invention is to provide a novel tool holder and means for the adjustment of the cutting tools, illustrated on a machine having a master cam surface provided with opposite involute curves which guides the tool holder in such a manner that a shave is made on an involute curve of a roughed gear tooth.

The tool holder shown is drum shaped mounted to oscillate upon a main supporting frame. By placing two cutting edges in the holder, a shave is made by cutting one side of a tooth, corresponding to the shape of the involute cam and on return movement of the drum, a shave is made by the other cutting edge on the opposite side of another tooth.

Another object of the invention is to maintain an accurate and constant dimension between the cutting edges of the tools when used in this manner and to provide means for definitely advancing the tools an equal distance with respect to each other so that successive shaves may be made without cutting the tooth to its finished dimension in a single operation.

It is another object of the invention to provide means for permitting advancing of the tools in definite successive steps illustrated by limited movement of a wedge which oppositely pivots the tools about a common center.

These and other objects of the invention will more fully appear from the following description and claims taken in connection with the accompanying drawings, in which:

Fig. 1 is a sectional view of the machine showing particularly the driving mechanism.

Fig. 2 is a sectional view taken on line 2—2 of Fig. 3, showing the drum and its mounting.

Fig. 3 is an end view of the drum and tool holder, parts being broken away.

Fig. 4 is a sectional view on line 4—4 of Fig. 3.

Fig. 5 is an opposite end view of the drum showing the indexing mechanism.

Referring to the drawings wherein a machine has been illustrated embodying the invention, and particularly to Fig. 1, a main base 10 is shown upon which is mounted an oscillating drum and within which is mounted the driving mechanism. The drive is taken from some source of power, not shown, thru wheel 12, shaft 14, clutch 16 and worm gears 18 and 20. Secured to the gear 20 is one end of a pitman rod 22 having its opposite end connected to segmental gears 24 pivoted as at 26 to the base 10. The segmental gears 24 project thru the base 10 and are in mesh with gears 28 secured to the drum 30 thru links 32, thus adapted to impart an oscillating motion to the drum 30.

Referring to Fig. 2, a pair of supports 34 are secured to the upper surface of the base 10 by bolts 36. Bushings 38, mounted in the supports 34, are provided with a spindle 40 rotatably mounted therein. At the opposite outer ends of the bushings 38 are mounted cams 42 rigidly attached to the supports 34. These cams are each formed having oppositely arranged involute surfaces which guide the drum 30 during its oscillating movement. Between the cams 42 and supports 34 are bearings 44 which support gears 28 attached to the drum 30 thru links 32.

The drum 30 is supported on the cams 42 by means of rollers 46 and the front end, which slides with respect to the spindle 40, is mounted on a slide block 48 which fits an elongated opening 50 in the front end of the drum 30. The opening 52 at the rear end of the drum permits the combined oscillating and sliding movement of the drum around the spindle 40. Mounted in the spindle 40 is an arbor 54 which supports the gear, shown as a cluster gear 56, to be finished. The forward end of the arbor 54 is supported by a bracket 58 secured to the base 10, the opposite end of the arbor 54 being provided with indexing mechanism.

Referring to Fig. 5, wherein the indexing mechanism has been shown more in detail, a cam 60 carried by the drum 30, is adapted to move a lever 62 to the left, when the drum 30 is rocked clockwise in Fig. 5. This movement is transmitted thru link 64 to a horizontally movable member 66 which permits a dog 68 to engage an adjacent tooth on the ratchet 69 adapted to rotate the arbor 54 and gears 56. During the return movement of the drum 30 a cam 70, rotatable in a counter clockwise direction and with the shaft 72, reciprocates a lever 74, which, connected to the member 76, disengages dogs 78 from a ratchet 80 rotatable with the ratchet 69.

The cam 60 thru the lever 62, and link 64 pulls the member 66 to the right rotating the ratchet 69 and gear 56 to a position for the next cut. The rotation is limited by a dog 82 brought into engagement with a ratchet 84 by the movement of the member 66. The cam 70 then brings the dogs 78 into engagement with the ratchet 80 locking the ratchets and gear against rotation.

The machine is started by engaging the clutch 16 which is accomplished by moving a lever 86 to the left. A lever 88, connected to the lever 86, is pivotally connected to a lever 90 thru a link 92 and the downward movement of the lever 90, caused by moving the lever 86 to the left, engages the clutch by a sliding member 94 connected to the clutch and in engagement with a slot 96 on the lever 90.

In order that the machine may be automatically stopped after all teeth have been cut or after one complete revolution of the gear, a cam 98 has been shown adapted to rotate with the gear 56 and is provided with a notch 100 in its periphery. When the machine is stopped, one end of a rod 102 is adapted to engage the notch 100 to prevent rotation of the gear 56. The other end is connected to a lever 104, pivotally connected to the base 10, and a link 106, extending downwardly from the outer end of the lever 104, has its lower end provided with a slot 108 engaging a pin 110 on the lever 88. A spring 112 resiliently urges the rod 102 and connecting links upwardly so that when the notch 100 is in alignment with the upper end of the rod it engages the notch, preventing rotation of the gear, and at the same time disengages the clutch 16 by the upward movement of the link 106, lever 88, and links 92 and 90, the latter link sliding the member 94 outwardly. Thus the machine is automatically stopped at the end of a complete revolution of the gear to be cut.

Referring particularly to Figs. 3 and 4 wherein the preferred embodiment of my invention has been shown, a novel tool holder is secured to a head section 120 which is bolted to the drum 30 by bolts 122. An upper spindle 124 and a lower spindle 126 are screw threaded into the head 120 and a pair of opposite tool holders 128 are pivoted on the lower spindle 126. Blocks 130 form outer bearing members for the tool holders 128. A block 132 is detachably secured to the head 120, by bolts 134 and is provided with a tapered surface which engages a correspondingly tapered surface on the bearing blocks 130.

Adjusting screws 136 limit the amount of downward movement of the blocks 130 when they are secured to the block 132 as by screws 138. This provides a means for taking up for wear on the bearing surfaces of the tool holders 128 and the bearing blocks 130.

Slots 140 receive the tools 142 and wedge blocks 144, the latter bearing against the tool and a tapered surface at one side of the slot to hold the tool in locked position. The wedge blocks 144 are forced into position by clamps 146 pivoted as at 148 and forced down by nuts 150 screw-threaded to studs 152. The downward movement of the clamps 146 force plungers 154 into engagement with the wedge blocks 144 and securely retain the tools 142 in position.

In order to strengthen the tool holders 128, weakened by the slots 140, plates 156 have been bridged across the slots to tie the ends of the tool holder together. Flanges 158 on the plates fit recesses in the tool holders 128 thus preventing the wedge block 144 from spreading or breaking the tool holder.

A clamp 160 on the spindle 126 is forced against the plates 156 and prevents angular movement of the tool holders 128 around the spindle 126 when the nut 162 is screwed down against the lug. A lock nut 164 is provided to prevent loosening of the nut 162. To position the tools 142 vertically adjustable screw threaded members 166 have been provided in the holders 128, accessible thru openings 168, adapted to bear against the tools 142.

As a means for adjusting the tools with respect to each other or for accurately spacing them horizontally a predetermined distance, a wedge has been provided at the upper ends of the tool holders, axially adjustable to pivot the latter on their axes or spindle 126. The upper spindle 124 is provided with a sleeve portion 170 upon which is slidably mounted a segmental cone shaped wedge member 172 and within which is a screw threaded member 174 to which is secured a handle 176. A plate 178 is supported on the threaded member 174 and held against rotation thereon by means of lugs 180 on the sleeve 170, projecting in openings 182 in the plate 178. The wedge member 174 is carried by a flange 184 in engagement with a collar 186 on the cone member. Both the plate and wedge member 172 move axially against a coil spring 188 by angular movement of the handle 176 and threaded member 174.

When the handle is moved clockwise the screw threaded member 174 draws the wedge member 172 inwardly between the tool holders 128, separating the upper ends and causing them to pivot around the spindle 126 and between bearings 130 in opposite directions. A bolt 190, extending thru the upper ends of the tool holders 128 and projecting beyond the outer surfaces thereof, has its opposite ends provided with adjustable abutments 192 and between the abutments and the outer surfaces of the tool holders are springs 194 for resiliently holding the upper ends of the tool holders together, against the wedge member 172, and the opposite or lower ends apart.

Notches 196 have been formed in the plate 178 to receive a resilient plunger 198, carried by the handle, to definitely determine the amount of spread or the resultant cut on the gear tooth. The location of these notches are predetermined depending on the depth of cut desired, and on the machine illustrated, each tooth is cut three times; the first being the rough cut with the handle in position shown, the next cut, preferably .0015 of an inch, with the handle moved to the next notch, and the final cut, preferably .001 of an inch, with the handle moved to the last notch.

It will be understood that when a single tool holder is used, successive cuts cannot be made as the cutting edges of the tool are definitely spaced for all times and the result of such a cut, very often greater than the tool will stand, soon ruins the tool requiring replacement at frequent intervals.

A smooth polished cut cannot be had when cutting a large chip, as with a non-adjustable tool. In the form illustrated, the depth of the cut can be predetermined and successive shaves made without injury to the tool and the adjustable tool permits the final cut to be a small one thus producing a highly polished surface.

While the adjustment of the tools provides for diminishing the distance between the cutting edges, by movement of the handle in one direction, the reverse movement of the handle permits an adjustment for increasing the distance between the cutting edges in the same proportion. The tools are rigidly held in any adjusted position.

The arrangement of the plates are such that both tools are moved the same distance by the one adjustment, thus permitting the same cut to be made on each side of different teeth.

While the invention has been illustrated and described specifically to one particular adaptation it is to be understood that various changes including size and arrangement of parts may be made without departing from the spirit thereof and its scope is not to be limited other than by the terms of the appended claims.

What we claim is:

1. In a tool holder of the class described comprising, a pair of tool holding members pivoted on a common center, cutting tools in said tool holding members, an axially movable wedge between said tool holding members for moving them in opposite directions, and resilient means for holding said tool holding members against said wedge.

2. In a tool holder of the class described comprising, a head, a pair of vertically spaced spindles on said head, a pair of tool holding members pivoted on one of said spindles, cutting tools in said tool holding members, an axially movable wedge concentric with the other of said spindles for moving said tool holding members angularly on their pivot.

3. In a tool holder of the class described comprising, a head, a pair of vertically spaced spindles on said head, a pair of tool holding members on one of said spindles, cutting tools in said tool holding members, and a cone shaped wedge concentric with the other of said spindles and movable axially thereon for moving said tool holding members angularly on their pivot in opposite directions.

4. In a tool holder of the class described comprising, a head, a pair of vertically spaced spindles on said head, a pair of tool holding members pivoted on one of said spindles, cutting tools in said tool holding members, a cone shaped wedge on the other of said spindles between said tool holding members, means for moving said cone axially in one direction on said spindle for moving said tool holding members angularly on their pivot, and means for returning said tool holding members when the cone is moved axially in the opposite direction.

5. In a tool holder of the class described comprising a support, a spindle on said support, a pair of tool holding members each having semi-cylindrical bearing surfaces on said spindle and arranged thereon opposite one another, a pair of adjustable bearing surfaces on said support adapted to engage the outer surfaces of said tool holding members in opposite directions between said bearings and said spindle.

6. In a tool holder of the class described comprising, a tool holding member having a slot therein, a tool in said slot, means for wedging said tool in locked position against one side of the slot, and means bridging said slot to tie the opposite edges of said tool holding member against spreading when said tool is wedged in locked position.

7. In a tool holder of the class described comprising, a tool holding member having a slot therein, a tool in said slot, means for moving said tool longitudinally in said slot, means for wedging said tool in locked position within said slot, means bridging said slot to the opposite edges of said tool holding member against spreading when said tool is wedged in locked position, and means for angularly adjusting said tool holding member.

8. In a tool holder of the class described comprising, a pair of tool holding members pivoted on a common center, an axially movable wedge for separating said tool holding members at one side of their common center, angularly movable means for axially moving said wedge, and stops for determining the amount of such movement.

9. In a tool holder of the class described comprising, a pair of tool holding members pivoted on a common center, an axially movable wedge for angularly moving said tool holding members in opposite directions on their common center, angularly movable means for axially moving said wedge, a series of progressingly decreasing stops coacting between said angularly movable means and said axially moving wedge, and means for locking said tool holding members in adjusted position.

FRANCIS T. SWAIN.
MERLE C. ST. CLAIR.